United States Patent
Boer et al.

(10) Patent No.: US 7,759,635 B2
(45) Date of Patent: Jul. 20, 2010

(54) MINIATURIZED OPTICAL TWEEZER ARRAY

(75) Inventors: Gerben Boer, Lausanne (CH); Fabrice Merenda, Lausanne (CH); Guy Delacretaz, Préverenges (CH); René Salathe, Ecublens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 12/083,240

(22) PCT Filed: Oct. 7, 2006

(86) PCT No.: PCT/IB2006/053680

§ 371 (c)(1),
(2), (4) Date: Apr. 8, 2008

(87) PCT Pub. No.: WO2007/042989

PCT Pub. Date: Apr. 19, 2007

(65) Prior Publication Data

US 2009/0190221 A1 Jul. 30, 2009

(51) Int. Cl.
*H01S 3/00* (2006.01)
(52) U.S. Cl. ...................................... 250/251
(58) Field of Classification Search ............ 250/251
See application file for complete search history.

(56) References Cited

U.S. PATENT DOCUMENTS 7,193,782 B2 * 3/2007 Menon et al. ............... 359/626

| 2004/0256542 | A1 | 12/2004 | Okazaki |
| 2005/0098717 | A1* | 5/2005 | Grier et al. ............ 250/251 |
| 2005/0146794 | A1 | 7/2005 | Menon et al. |
| 2007/0235640 | A1* | 10/2007 | Gruber et al. .......... 250/251 |

FOREIGN PATENT DOCUMENTS

| WO | 03/035824 | 5/2003 |
| WO | 2004/025668 | 3/2004 |

OTHER PUBLICATIONS

Zemanek et al., "Optical Trapping of Nanoparticles and Microparticles by a Gaussian Standing Wave", *Optics Letters, Optical Society of America*, vol. 24, No. 21, Nov. 1999, pp. 1448-1450, XP000893671.
Casaburi et al., "Two-and three-beam interferometric optical tweezers", *Optics Communication*, vol. 251, No. 4-6, Jul. 2005, pp. 393-404, XP004953520.
Constable et al., "Demonstration of a Fiber-Optic Light-Force Trap", *Optics Letters, Optical Society of America*, vol. 18, No. 21, Nov. 1993, pp. 1867-1869, XP000402580.
International Search Report for PCT/IB2006/053680 mailed Feb. 22, 2007.
Written Opinion for PCT/IB2006/053680 mailed Feb. 22, 2007.

* cited by examiner

*Primary Examiner*—Jack I Berman
*Assistant Examiner*—Hanway Chang
(74) *Attorney, Agent, or Firm*—Nixon & Vanderhye P.C.

(57) ABSTRACT

Apparatus for forming a single or a plurality of threedimensional optical traps, the apparatus comprising: a. A collimated light source that is directed onto an array of focalizing refractive or diffractive elements providing a single or a plurality of focal areas, and b. An array of reflective elements, placed opposite to the said focalizing elements described in a), which reflect back the light into the said focal area. The invention also relates to a method for using this apparatus.

24 Claims, 5 Drawing Sheets

MINIATURIZED OPTICAL TWEEZER ARRAY

This application is the U.S. national phase of International Application No. PCT/IB2006/053680 filed 7 Oct. 2006 which designated the U.S. and claims priority to International Application No. PCT/IB2005/053329 filed 11 Oct. 2005, the entire contents of each of which are hereby incorporated by reference.

FIELD OF INVENTION

The present invention relates to the manipulation of particles by using electromagnetic radiation forces.

It more precisely relates to optical tweezers and to a method for using such objects.

STATE OF THE ART

Momentum transfer between light and dielectric matter allows manipulation of micron-sized particles immersed in a fluid media whose refractive index is different than that of the particle. In particular, a highly focused laser beam allows three dimensional trapping of particles having an index of refraction higher than that of the surrounding media (A. Ashkin and J. M. Dziedzic, "optical trapping and manipulation of viruses and bacteria", Science, 235, 1517 (1987)). It has already been demonstrated that optical trapping is a useful tool in biology and biophysics (K. C. Neuman and S. M. Block, "Optical trapping", Rev. Sci. Instrum., 75, 2787 (2004)). Today there is a growing interest in lab-on-a-chip devices for biochemical applications, and optical tweezers provide a possibility for manipulating biological and biochemical objects in fluidic systems. For most applications efficiency is enhanced when a large number of objects can be processed in parallel, thus arrays of optical tweezers are needed. Individual trap addressing is also a key issue.

U.S. Pat. No. 6,055,106 or US patent application 2004/0207922 disclose a tweezers array which is created using a diffractive optical element (DOE). The DOE's described in these prior art inventions consists either in fixed DOE's or computer controlled DOE's the latter being commonly produced using a spatial light modulator (SLM). The phase-modulated light beam (hologram created by the DOE) forms in the image plane of the focusing lens a multiplicity of focus points that are used as optical traps. However, the diffractive optical elements often produce unwanted ghost images and additional diffraction orders that significantly reduce the trapping efficiency (trapping force per unit light power) of the system. Sinclair and al. (G. Sinclair and al., J. Modern optics, vol. 51, p. 409-414) performed an exhaustive study of the limitations related to the use of diffractive elements. Moreover SLM are expensive and rather slow devices. Indeed, in the referred invention, each trap movement requires the recalculation of the hologram corresponding to the desired trap configuration, this being a very time consuming task, which prevents fast real-time particle manipulations.

Another form of prior art system, that also uses a SLM, is based on the General Phase Contrast method (GPC). In this method there is no need to calculate complicated holograms corresponding to the desired trap arrangement in the focal plane of the objective. The desired intensity distribution can directly be encoded on the SLM. This method is faster than the previous one, but it is still relatively slow compared to our method. The state-of-the-art spatial light modulators used in these systems are based on nematic liquid crystal matrices that have slow response times (about 20 ms) and consequently the displacement velocity of the trapped objects is limited to a few micrometers by second. Additionally the use of phase contrast filters may introduce important losses of light in the system, which reduces the trapping efficiency of the optical traps.

In another prior art system, optical traps are based on optical fibers as described in Japanese Patent Application No. JP9043434 or JP2005007530. These systems permit to create large arrays of traps, but optical trapping is only 2-dimensional because of the low NA at the output of the fibers. Consequently these systems can only be used for applications where wall sticking is not an issue.

In another prior art system multiple optical traps are obtained by using arrays of VECSELs (Vertical External Cavity Surface Emitting Lasers). The light emitted by the VECSELs is collimated and coupled into a high-NA focusing lens, thus obtaining an array of static optical traps. The drawback of this approach is that large arrays of more than 50 VECSELs are difficult to manufacture because of the limited fabrication yield. Moreover the output power of such lasers is actually not sufficient for strong optical trapping, and the quality of the laser beams, which is of major importance for optical trapping, may not be as good as necessary. The present invention is based on a single powerful laser and does not need heavy multiple laser systems.

In still another prior art system, four optical traps are generated by imaging four focal points that are created by four independent lenslets in the focal plane of a high NA microscope objective (R. Eriksen and al., "Spatial light modulator-controlled alignment and spinning of birefringent particles optically trapped in an array", Applied Optics, 42, p. 5107). This approach is however limited to a small number of traps since it becomes difficult to align in a small volume large array of lenslets. The present invention does not suffer from this major drawback since it uses micro-lens arrays that are fabricated in a single wafer with photolithographic methods and are this way already precisely aligned. In a further prior art system (C. H. Sow, "Multiple-spot optical tweezers created with micro-lens arrays fabricated by proton beam writing", Applied Physics B, 78, p. 705), optical traps are generated by focalizing an array pattern of focal points created by a micro-lens array into a high NA objective.

As described in the previous paragraphs, most of the prior-art optical trapping methods deal with the generation of a single or a plurality of focused beams. Efficient trapping in space, that is in each of the three dimensions, and particularly along the axial direction, requires a highly convergent beam that can only be produced by objectives with numerical apertures higher than 0.8 (U.S. Pat. No. 3,710,279). This implies the use of immersion objectives with extremely short working distances and requires very thin glass coverslips. This can be a substantial limitation when used in combination with other technologies such as for example micro-fluidic devices. In addition, the field of view of high NA microscope objectives is limited and this severely limits the number of objects that can be trapped and monitored. Above all the use of voluminous and complex microscope objectives prevents system miniaturization.

Another method for producing 3-dimensional optical traps, called "dual beams optical traps", uses two coaxial counter-propagating beams. In an optical tweezer, the scattering forces that tend to push the particle along the direction of propagation (axial direction) need to be compensated by the gradient forces thus requiring a tightly focused beam. In a dual beams configuration, the axial scattering forces exerted by the two beams compensate each other. Thus high light gradients in the axial direction are not necessary and lower numerical aperture objectives can be used. Some systems using this trapping scheme have been proposed. They are principally based on two counter propagating Gaussian beams emanating from two opposite single mode fibers (A. Constable and al., Optics Letters, 18, p. 1867-1869, (1993)), generated by means of beam splitters and optical alignment tools ((J. Glueckstad, WO2006097101), or, originating directly from two opposite lasers (A. Ashkin, Physical Review Letters, 24,156-159, (1970).

Counter propagating systems require very accurate alignment (with micrometer precision) and a careful balancing of the light power. These restrictions make a simple and inexpensive realization of an array of such traps difficult. Since these systems need multiple laser sources or a set of beamsplitters, bulky lenses and alignment material to create the counter-propagating beams pairs, miniaturization might prove to be very challenging.

The Gaussian standing wave method is another known way of trapping micro-objects without using high NA optics (P. Zemanek and al, Optics Letters, 24, p. 1448-1450, (1999)). In this method a standing wave is obtained under a microscope objective (NA=0.55) as a result of the interference of an incoming laser beam and the back reflected beam from a flat mirror. Here the scattering forces are partially balanced by the reflected beam. This approach presents several drawbacks: since the method is based on an interferential principle, it is very sensitive to environmental fluctuations and particularly to vibrations; due to the divergence of the reflected beam, the flat mirror has to be placed very close to the trapping plane (area) in order to allow compensating the axial scattering forces. The very small mirror-trap distance may be a limitation for some applications such as for example in microfluidic devices. Also the possibility to make array of traps with this method has not been clarified yet.

GENERAL DESCRIPTION OF THE INVENTION

The general objective of the present invention is to provide an improved method and an improved apparatus with respect to prior art methods and apparatuses.

The main aspect of the present invention is the generation of 3-dimensional optical trapping system (optical tweezers) by using refractive and reflective micro-optical elements. The invention is particularly beneficial for the use of optical trapping in combination with small integrated devices such as for example in bio-chip technologies.

It is known by those skilled in the art that micro-lenses of good quality (diffraction limited) with numerical apertures higher than 0.8 are difficult to manufacture. As a consequence it is not possible with only refractive (or diffractive) micro-optical elements to generate sufficiently high gradient forces to balance the scattering (axial) forces exerted on the trapped objects, thus real 3D trapping of objects is impossible by only using a single micro-lens array. The present invention demonstrates that efficient 3-dimensional optical traps can be obtained by using an array of micro-lenses in combination with an array of micro-mirrors that counter balance the scattering forces. The two arrays can be passively aligned with respect to each other by properly laying out and dimensioning the fluidic device between them and by using standard alignment techniques (such as, e.g., reference points, grooves, holes.) that have been developed for the assembly of micro-systems. No further alignment is needed after assembly of the system. The proposed systems do not require necessarily microscope objectives. The number of trapped particles is no longer limited by the restricted field of view of high NA microscope objectives. The systems can be scaled up for trapping very high numbers of particles.

DETAILED DESCRIPTION OF THE INVENTION

The invention is discussed below in a more detailed way with examples illustrated by the following figures.

NUMERICAL REFERENCES USED IN THE FIGURES

Figure 1:
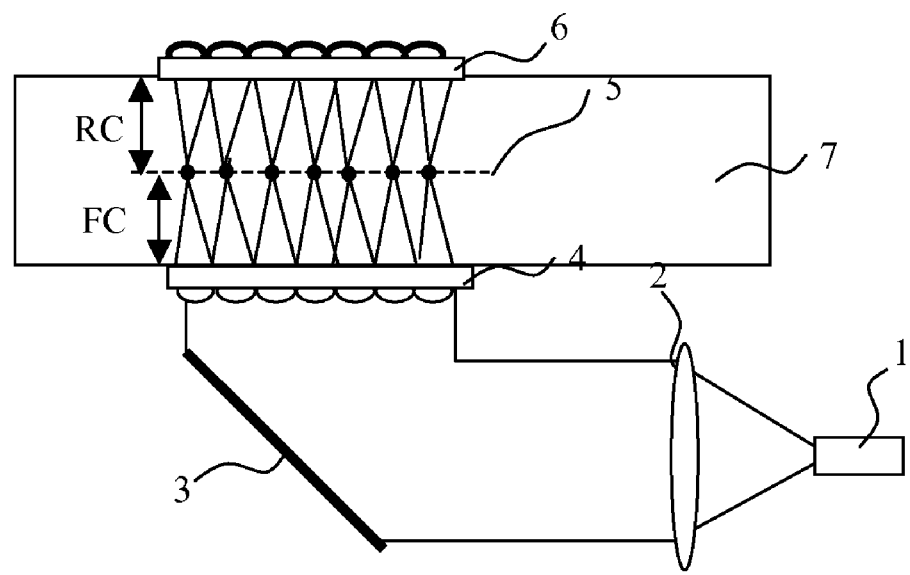
FIG. 1 represents a first embodiment of miniaturized trapping device according to the invention.

1. Laser source
2. Collimation Lens
3. Relay mirror
4. Micro-lens array
5. Optical trapping plane
6. Micro-mirrors array
7. Fluidic device
8. Collimated light beam for optical trapping (wavelength $\lambda_t$)
9. Optical valves
10. Optical valves control system
11. Array of micro-lenses
12. Collimated beam+white light illumination
13. Index matching fluid
14. High NA microscope objective
15. Inlets
16. Main channel
17. Fluidic device
18. Collimated light beam for fluorescence excitation (wavelength $\lambda_e$)
19. Collimated light beam fluorescent light (wavelength $\lambda_f$)
20. Dichroic beam splitter (reflective for $\lambda_t$ transparent for $\lambda_f$ and $\lambda_e$)
21. Dichroic beam splitter (reflective for $\lambda_f$ transparent for $\lambda_e$)
22. Lens system
23. Photo-detector array Abbreviations Used in the Figures:
RC: Radius of curvature of the micro-mirrors
FC: Focal distance of the micro-lens array The apparatus depicted in FIG. 1 represents a solution to realize compact optical 3D trap arrays. It essentially consists of a combination of two sets (arrays) of refractive and reflective micro-optical components. A collimated laser beam 1,2 is transformed by an array of refractive micro-lenses (or Fresnel lenses, diffractive elements) 4 to form an array of focus points at the focal plane (optical trapping plane) 5. An array of micro-mirrors (reflecting at least the wavelength of the trapping laser) of the same diameter (and NA) as the micro-lenses is placed in front of the micro-lens array at a distance that is preferably equal to the sum of the radius of curvature RC and focal distance of the micro-lenses FC. The role of micro-mirror array is to counter propagate the individual divergent beams back into their respective focal points. The trapping force in the transversal direction is given by the intensity gradient created by the focal point. The generation of focal points can be obtained by any diffractive or refractive optical element, such as holograms, Fresnel lenses, gradient index fibers, or refractive lenses obtained by thermal annealing. The micro-mirror array could also be replaced by a micro-lens-array followed by a plane mirror.

Figure 2:
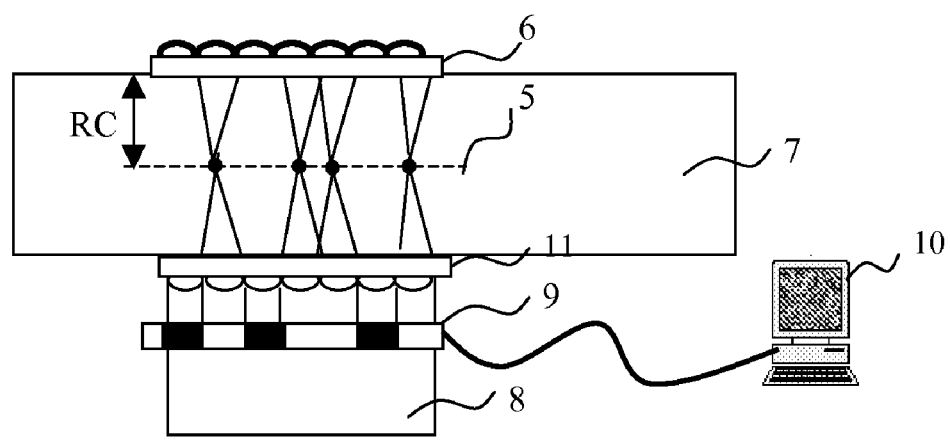
FIG. 2 represents another miniaturized trapping system according to the invention, this embodiment including optical valves.

In the embodiment shown in FIG. 2 an additional array of optical valves is added to allow addressing each individual trap independently. This offers an additional sorting option. A preferred embodiment is to use a liquid crystal (twisted nematic or ferro-electric) display (LC Display) as optical valves. In this case the light beam 8 must be polarized.

Figure 3:
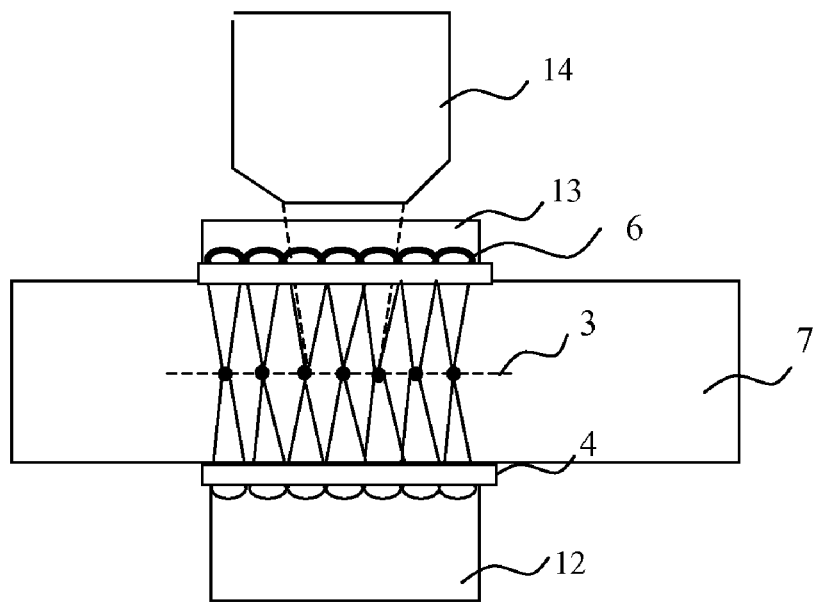
FIG. 3 represents another miniaturized trapping system according to the invention, this embodiment being combined with a microscope objective.

Many bio-chemical applications require observation with high magnification or high fluorescence collection scheme. In this case it is necessary to place a microscope objective near the trapping area. FIG. 3 shows schematically how such a setup can be realized. In this embodiment the micro-mirrors are coated with adequate dielectric layers that reflect only the trapping wavelength. The trapping area 5 can be observed with the transmitted light. In order to avoid unwanted refraction of the transmitted rays, which disturb the image, the micro-mirrors are immersed in an index matching material.

The trapping area can be illuminated with an additional fluorescence excitation beam. If the fluorescence excitation beam is co-linear with the trapping beam, it is focused on each of the trapped objects and an ensemble of samples can be tested in parallel. Combination of micro-mirrors 6 with an index matching fluid 13 allows fluorescence observation with a high NA microscope objective for a maximum photon collection.

Figure 4:
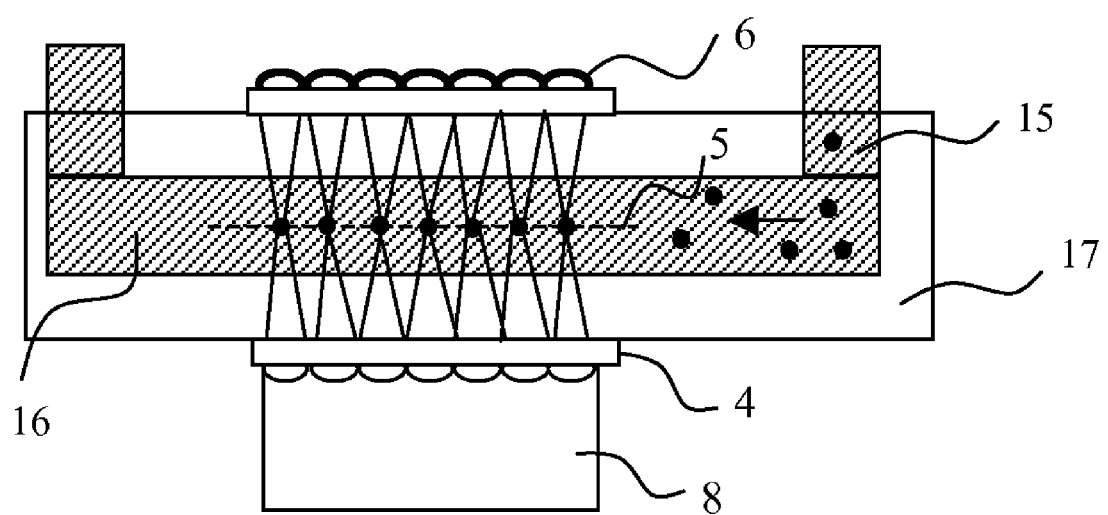
FIG. 4 represents another miniaturized trapping system according to the invention, this embodiment being combined with a fluidic device.

FIG. 4 shows an embodiment of the present invention where the miniaturized trapping method is directly integrated on a lab-on-a-chip device with micro-fluidics 17. Fluid inlets permit to introduce and carry the samples and the reactants up to main channel 16. The optical traps 5 lay within the analysis chamber (main channel) 16 of the chip 17. Fluorescence can be detected via a microscope objective as described in FIG. 3. Additional sorting of the analyzed objects is performed by individually switching off the traps with an array of optical valves as described in FIG. 2.

Figure 5:
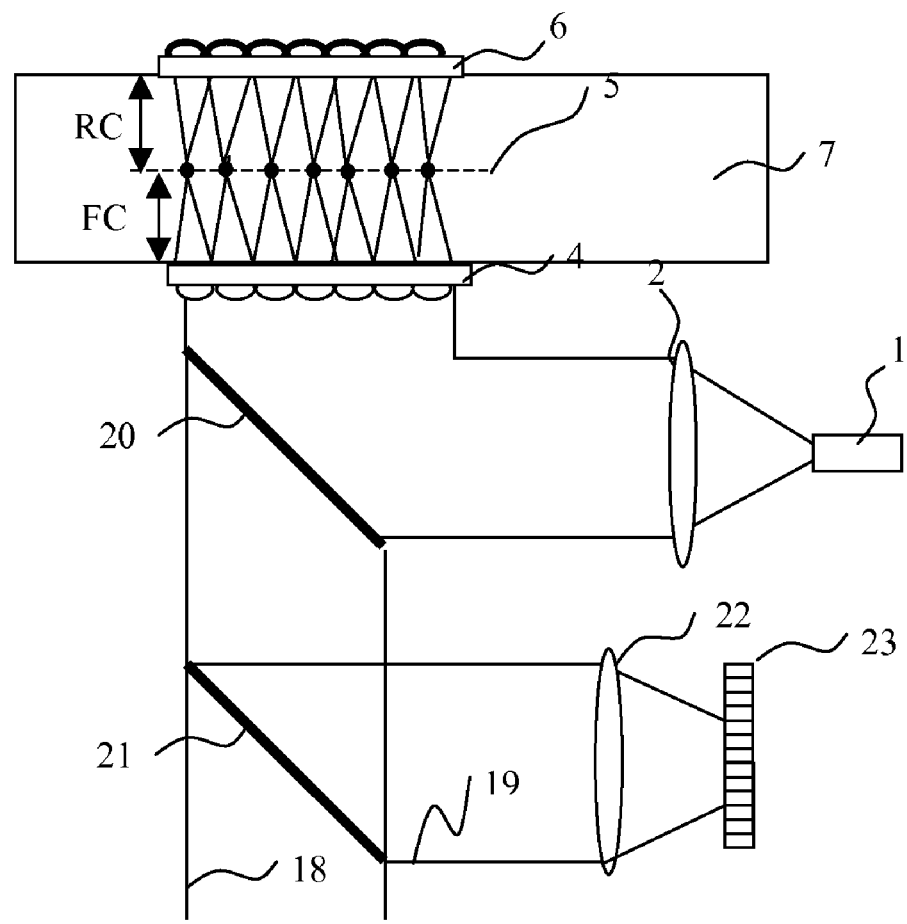
FIG. 5 represents another trapping system according to the invention, this embodiment being combined with a fluorescence excitation and detection system for monitoring biochemical reaction

FIG. 5 shows an embodiment of the present invention where dichroic mirrors 20,21 allow simultaneously trapping by means of light beam 8, fluorescence excitation 18, and fluorescence detection 19 of the trapped particles 5 by means of an additional light source for fluorescence excitation and a photo-detection array 23. This allows parallel monitoring of biochemical reactions occurring at the level of individual particles.

What is claimed is:

1. Apparatus for forming a single or a plurality of 3-dimensional optical traps, the apparatus comprising:
   a. A collimated light source that is directed onto an array of focalizing refractive or diffractive elements providing a single or a plurality of focal areas, and
   b. An array of reflective elements, placed opposite to the said focalizing elements described in a), which reflect back the light into the said focal area; and wherein the focal area is the optical trap.

2. The apparatus of claim 1 wherein the said light source is a laser beam.

3. The apparatus of claim 1 wherein the said light source is an array of Vertical External Cavity Surface Emitting Lasers (VECSELs).

4. The apparatus of claim 1 where the said focalizing elements are cylindrical lenses and the said reflective elements are cylindrical mirrors.

5. The apparatus of claim 1 wherein the said focalizing elements are donut shaped lenses.

6. The apparatus of claim 1 wherein the said focalizing elements are Fresnel type lenses.

7. The apparatus of claim 1 wherein the said focalizing elements are gradient index type (GRIN) lenses.

8. The apparatus of claim 1 wherein the said reflective elements are metallic mirrors.

9. The apparatus of claim 8 wherein the said reflective elements are designed to reflect the wavelengths used for the trapping and transmit the residual wavelengths.

10. The apparatus of claim 1 wherein the said reflective elements are dielectric mirrors.

11. The apparatus of claim 1 further comprising an array of optical valves that permits to switch on and off individually the optical traps.

12. The apparatus of claim 11 where the said optical valve is liquid crystal matrix (nematic or ferro-electric) and where the incoming collimated beam is polarized.

13. The apparatus of claim 11 where the said optical valves are computer controlled.

14. The apparatus of claim 1 wherein the said focal area is adapted to be observed with a microscope objective.

15. The apparatus of claim 14 wherein the said reflective elements are embedded in an index matching material.

16. The apparatus of claim 14 wherein an additional fluorescence excitation light beam is coupled into the said microscope objective.

17. The apparatus of claim 1 further comprising a fluidic device containing fluidic channels and inlets that permits to introduce the objects to be trapped into the fluidic system and where the said focal area (or trapping area) lays within one of the fluidic channels, said fluidic device and that being directed towards the fluidic channels.

18. The apparatus of claim 17 further comprising one or several fluorescence excitation light beams that are coupled into the said fluidic device and that are directed towards the trapping area.

19. The apparatus of claim 17 wherein the focalizing and reflective elements are at least partly integrated into the walls of the fluidic device.

20. Method of using the apparatus as defined in claim 1, said method consisting in the use of refractive or diffractive optical elements together with reflective optical elements, said reflective optical elements being used for counter balancing the scattering forces produced by said refractive or diffractive optical elements.

21. A method as defined in claim 20 for generating a plurality of three dimensional optical traps within a fluidic device by using a collimated light source, an array of refractive or diffractive elements for generating a plurality of focal-spots within the fluidic device and a second array of reflective elements for reversing the direction of light propagation behind the focal spots.

22. A method as defined in claim 20 wherein the collimated light source is composed of several wavelengths and wherein additional wavelength selective elements and light detectors are used for monitoring chemical reactions of the trapped particles.

23. A method as defined in claim 20 further including optical valves placed in the trapping beam for addressing individual traps.

24. A method as defined in claim 20 further including at least one microscope objective for monitoring.

* * * * *